United States Patent
Smith et al.

(10) Patent No.: US 8,320,840 B2
(45) Date of Patent: *Nov. 27, 2012

(54) METHOD AND SYSTEM FOR DIVERSITY USING ORTHOGONAL FREQUENCY/DIVISION MULTIPLEXING

(75) Inventors: Adrian Smith, Kanata (CA); Xiao-Dong Li, Nepean (CA); David Steer, Nepean (CA); Kelvin Kar-Kin Au, Ottawa (CA); Robert Novak, Ottawa (CA); Mark Earnshaw, Kanata (CA)

(73) Assignee: Apple Inc., Cupertino, CA (US)

( * ) Notice: Subject to any disclaimer, the term of this patent is extended or adjusted under 35 U.S.C. 154(b) by 141 days.

This patent is subject to a terminal disclaimer.

(21) Appl. No.: 12/787,480

(22) Filed: May 26, 2010

(65) Prior Publication Data

US 2011/0013678 A1    Jan. 20, 2011

Related U.S. Application Data

(63) Continuation of application No. 11/645,880, filed on Dec. 27, 2006, now Pat. No. 7,742,738.

(51) Int. Cl.
    H04B 17/00    (2006.01)
(52) U.S. Cl. .......... 455/67.16; 455/3.02; 455/12.1; 455/101; 455/115.1; 375/260
(58) Field of Classification Search ............ 455/12.1, 455/3.02, 517, 562, 561, 429, 427, 430, 13.1, 455/13.2, 67.3, 63, 67.16, 67.11, 428, 101, 455/452.2, 513, 502, 462, 436, 424, 115.1; 370/316, 345, 442, 342, 508, 332, 333, 503, 370/509, 512, 514, 513; 375/260, 267, 130, 375/347; 342/465, 387
See application file for complete search history.

(56) References Cited

U.S. PATENT DOCUMENTS

| | | | |
|---|---|---|---|
| 5,812,947 A * | 9/1998 | Dent | 455/427 |
| 5,898,929 A * | 4/1999 | Haartsen | 455/462 |
| 6,072,792 A | 6/2000 | Mazur et al. | |
| 6,157,811 A * | 12/2000 | Dent | 455/12.1 |
| 6,463,080 B1 * | 10/2002 | Wildey | 370/508 |
| 6,556,617 B1 | 4/2003 | Tsujimoto | |
| 6,788,917 B1 * | 9/2004 | Refai et al. | 455/12.1 |
| 6,801,589 B1 | 10/2004 | Dogan | |
| 7,187,903 B1 * | 3/2007 | Febvre et al. | 455/13.2 |
| 2003/0021351 A1 * | 1/2003 | Talwar | 375/267 |
| 2003/0026233 A1 | 2/2003 | Ohsuge | |
| 2003/0099304 A1 * | 5/2003 | Gore et al. | 375/267 |
| 2003/0171139 A1 * | 9/2003 | Sarresh et al. | 455/562 |
| 2004/0192201 A1 * | 9/2004 | Febvre et al. | 455/13.2 |
| 2006/0176937 A1 | 8/2006 | Bottero et al. | |
| 2006/0273960 A1 * | 12/2006 | Murphy et al. | 342/465 |
| 2007/0115910 A1 | 5/2007 | Tanada et al. | |
| 2008/0088499 A1 * | 4/2008 | Bonthron et al. | 342/104 |
| 2008/0100510 A1 * | 5/2008 | Bonthron et al. | 342/373 |
| 2008/0300003 A1 | 12/2008 | Jeck et al. | |

* cited by examiner

*Primary Examiner* — Tan Trinh
(74) *Attorney, Agent, or Firm* — Meyertons, Hood, Kivlin, Kowert & Goetzel, P.C.

(57) ABSTRACT

A method and system for achieving a link budget improvement in a diverse OFDM radio system by addressing the timing misalignment issue that can occur due to the differences in propagation time in signals between mobile stations and Radio Access Nodes. Timing misalignment is shared or split between the primary path to a primary Radio Access Node and a diverse path to a diverse Radio Access Node. The relative timing offsets between mobile stations are adjusted, the mobile stations are grouped into zones using a variety of different grouping techniques, and the transmission for each mobile station is scheduled, using one or more of a variety of scheduling techniques.

20 Claims, 6 Drawing Sheets

METHOD AND SYSTEM FOR DIVERSITY USING ORTHOGONAL FREQUENCY/DIVISION MULTIPLEXING

CROSS-REFERENCE TO RELATED APPLICATION

This application is a continuation of U.S. patent application Ser. No. 11/645,880, filed Dec. 27, 2006, entitled METHOD AND SYSTEM FOR DIVERSITY USING ORTHOGONAL FREQUENCY/DIVISION MULTIPLEXING, the entire contents of which is incorporated herein by reference.

STATEMENT REGARDING FEDERALLY SPONSORED RESEARCH OR DEVELOPMENT

N/A

FIELD OF THE INVENTION

The present invention relates to communication networks and more particularly to a method and system that achieves a link budget improvement by addressing the timing misalignment issue that often arises in diverse OFDM systems.

BACKGROUND OF THE INVENTION

Radio frequency ("RF") communications can be defined by a "link budget". A link budget includes the addition and subtraction of gains and losses along an RF communication link. When the gains and losses of various components along the RF link are determined and summed, the system performance can be estimated. At a receiver, the signal-to-noise ratio ("SNR") must be above a certain threshold, for a given bit error rate ("BER") probability, in order for successful communication to take place. It is an objective of system designers to improve the link budget while at the same time lowering the overall cost of the system. With respect to either the uplink direction, that is the direction from a mobile to the network satellite or base transceiver system (BTS), or the downlink direction from the network satellite or BTS to the mobile, if the link budget is improved, less power will be required, and a smaller mobile unit with a longer battery life can be provided. Further, the mobile unit will not need to have as large an antenna.

Factors included in the link budget include the power amplifier output power, transmit antenna gain, slant angles and corresponding atmospheric loss over distance, transponder noise levels and power gains, receive antenna and amplifier gains and noise factors, cable losses, interference levels, and attenuation factors due to climate conditions. It is the goal of system designers to obtain a link budget improvement in various areas of the communication path. One technique to improve the link budget is to use a technique known as "diversity".

Diversity allows for the use of multiple communication paths between transmitters and receivers. This diverse path may, under certain conditions, turn out to be the optimal signal path, as opposed to the "primary" path. By enabling communication among different paths, an optimal and efficient communication system can be developed.

The use of satellites for personal and business communications is an important technique in global communication networks. While satellite communication systems provide obvious benefits that allow users to transmit and receive communication signals over a large footprint, these systems are not without their inherent problems. Diverse satellite systems allow system designers to combine the signals from multiple satellites. One known method is the maximum ratio combining technique where complex amplitudes are weighted according to the received signal strength. In other words, if two signals are received, each from a different satellite, the stronger of the two signals is given greater weight, since it is less error prone.

The use of multiple satellites in a diversity system can result in a link budget improvement. However, a problem associated with satellite diversity is that the satellites are situated at different locations and the propagation time is different between a mobile or terrestrial station and the satellites. Another problem associated with satellite communication systems is inter-symbol interference (ISI). ISI arises when there is a distortion of the received communication signal. This distortion results from the overlap of individual pulses to the degree that a receiver cannot distinguish between individual signal elements. Methods of solving the problem of ISI can often involve complicated equalizing schemes for non-OFDM based systems. A much simpler and effective way to address the ISI problem in OFDM systems is via the use of cyclic prefixes.

A modulation scheme that is used in satellite and some forms of terrestrial communications is Orthogonal Frequency Division Multiplexing (OFDM). The OFDM modulation technique transmits large amounts of data over a radio wave by splitting the signal into multiple smaller sub-signals that are then transmitted simultaneously to the receiver at closely spaced frequencies or sub-carriers. The OFDM modulation technique allows for the use of a cyclic prefix to address the problem of inter-symbol interference (ISI). An OFDM symbol can be extended by the use of a cyclic prefix (CP). In one common technique to generate the CP at the transmitter, the last part of each OFDM symbol is inserted at the start of the same symbol. At the receiver, the portion of the signal within the cyclic prefix of the OFDM symbol mitigates the distortion caused by the multi-path propagation of the radio link. If multiple signals are received due to multi-path propagation, ISI is prevented if the relative delay is less than the CP. Any delay greater than the cyclic prefix length causes ISI, while any delay less than the cyclic prefix length avoids ISI.

In the uplink portion from mobile station to satellite of the communications system, each mobile station may be allocated a subset of different OFDM sub-carriers. Because each mobile station is situated in a different location and has a different propagation delay to the satellite, they each must be synchronized in such a way so that the signals all arrive at the satellite or base transceiver station ("BTS") at the same time, or at least within the CP, in order to avoid ISI. If the transmission is received outside of the CP, there will be excessive interference and the communication performance will be reduced. Thus, for example, for a communications system having one or more satellites in or near geostationary orbit around the Earth, a transmission from a transmitter in nearer the equator, such as from a mobile station located in the State of Texas, arrives at the satellite sooner than a transmission located in a more northern latitude, such as from Canada, because Texas is physically closer to the satellite. The process of establishing timing and power alignment through a communications link is sometimes called "ranging".

A ranging problem that often occurs with a diverse satellite system is that due to the fact that the satellites are at different locations, the propagation time between the mobile stations and the satellites is different. If some mobiles "range" through one satellite and other mobiles "range" through other satellites, the diverse signals may be more than the CP apart in time, resulting in a timing misalignment and causing ISI to occur. Further, the link budget may not be improved by the requisite amount.

What is therefore needed is a method and system that resolves the timing misalignment issue that occurs during the ranging and transmission processes in a diverse communication system while improving the overall link budget.

SUMMARY OF THE INVENTION

The present invention advantageously provides a method and system for achieving a link budget improvement in a diverse communication system such as a satellite-based system. The method and system include steps that result in the adjustment of timing offsets between mobile stations and the sharing or reallocation of timing misalignments among the diversity paths through the diverse satellite paths. Once the timing misalignments have been reallocated, various zoning and scheduling methods are employed in order to schedule the transmissions of various mobile stations within a common zone.

In accordance with one aspect, the present invention provides a method for improving the overall link budget in a diverse communication system. The communication system includes a plurality of terrestrial mobile stations in communication with one or more receiving stations. The method includes determining the relative timing differential values between the plurality of mobile stations when the mobile stations transmit to the one or more receiving stations via one or more diverse paths wherein the timing differential values result in a timing misalignment. The method further includes resolving the timing misalignment by allocating the relative timing differential values among the one or more diverse paths.

In accordance with another aspect, the present invention provides a base transceiver system for improving the overall link budget in a diverse communication network. The system includes a timing differential module for determining the relative timing differential values between mobile stations when the mobile stations transmit via diverse paths and a transmission module for distributing the relative timing differential values among the diverse paths.

In the following description of this invention, the improvements are discussed in relation to the mobile-to-satellite communication link, however, the techniques described herein are not restricted solely to this type of communication link, but may be applied to all RF communication links. The techniques, for example, can also be applied to the downlink direction, from the satellite to the mobile and in general to all communications links irrespective of the direction of the information transfer.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

The present invention provides a method and system for improving the link budget in a diverse OFDM-based communication system by addressing the timing misalignment issue that often occurs due to the differences in propagation time in uplink signals between mobile stations and receiving stations, which in turn affects the usefulness of the OFDM cyclic prefix. A receiving station is defined as any device that serves as a terminus for the signals transmitted by one or more transmitting stations. The receiving station may include mobile stations, satellites and terrestrial base stations. The present invention addresses timing misalignment by sharing or splitting the timing misalignment between the primary path and the diverse path in a diverse communication system. The timing offset is adjusted and "shared" among the multiple receiving stations during the ranging process. Once the timing offset has been adjusted, the receiving stations can also be grouped into zones using a variety of different grouping techniques, and the transmission for each receiving station is scheduled using one or more of a variety of scheduling techniques.

Figure 1:
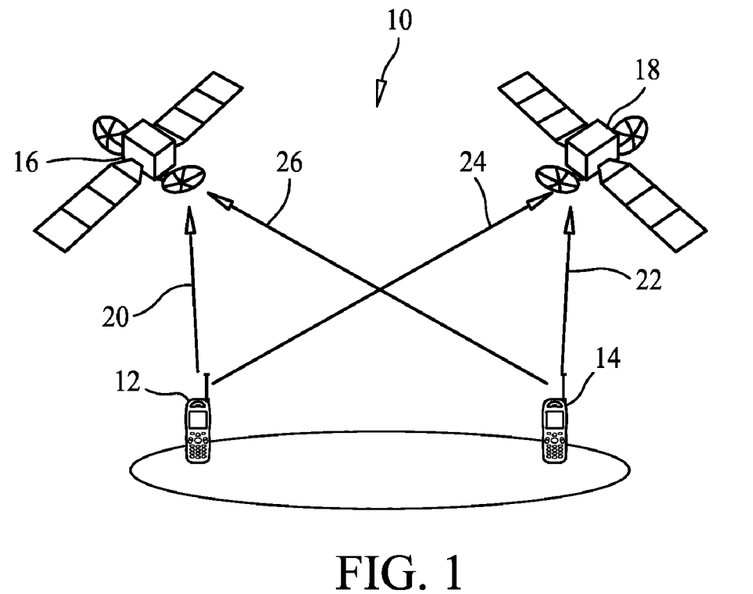
FIG. 1 is an illustration of an uplink portion of a diverse satellite communication system with two mobile stations sharing two satellites.

Referring now to the drawing figures in which like reference designators refer to like elements, there is shown in FIG. 1 a system constructed in accordance with the principles of the present invention and designated generally as "10". It should be noted that communication system 10 shown in FIG. 1 is only an exemplary communication system in which the present invention may be employed. Although FIG. 1 and the ensuing figures illustrate a diverse satellite system with two mobile stations and two satellites, it is within the spirit of the invention to utilize the present invention with other types of diverse satellite system designs, including a different number of mobile stations and/or satellites. Further, the invention is equally adaptable to non-satellite communication systems where mobile stations communicate with one or more receiving stations such as terrestrial base transceiver stations. Further, the invention is equally applicable to the uplink or downlink direction from the satellite to the mobile station. In other words, the invention is applicable to all RF communications systems irrespective of the direction of information transfer.

FIG. 1 illustrates a diverse satellite system whereby two mobile stations 12 and 14, are in communication with two satellites, 16 and 18. Typically, the satellites may communicate with terrestrial base transceiver stations (not shown) that enable communication among the mobile stations or to other nodes in the greater communications network. The satellites may utilize a single beam antenna for terrestrial coverage each with a single transceiver, or the satellites may use multiple "spot" beams to provide terrestrial coverage with multiple beams and multiple transceivers. The present invention is applicable to all known diversity techniques, including but not limited to switched diversity, selection diversity, and power combining diversity.

For ease of illustration and discussion, FIG. 1 shows two mobile stations 12 and 14, and two satellites 16 and 18, however the invention may be applied to a diverse satellite system with two or more satellites and multiple mobile stations, and is not limited to the arrangement depicted in the figures. Satellites 16 and 18 are satellites capable of transmitting data to and receiving data from one or more mobile stations. Mobile stations 12 and 14 may be any mobile communication devices that can exchange data with satellites 16 and 18. Diverse satellite systems such as the one shown in FIG. 1 allow mobile stations to transmit and receive signals to and from more than one satellite. This may be beneficial in instances, for example, where there is an obstruction blocking the communication path between a mobile station and a satellite. The use of a second, or "diverse" satellite, allows the mobile station to communicate with this other satellite, in order to maintain communication.

A base transceiver station (not shown) controls the interaction between the mobile stations and the satellites. The base transceiver station (BTS) includes the hardware and software components necessary to combine the diversity signals from each satellite and to control and schedule the uplink transmission from each mobile station to a satellite via the primary and the diverse paths. Because mobile stations are often located in various geographical locations, it is often necessary to synchronize ("range") each mobile station with one or more satellites, so that when the mobile station sends an uplink communication signal to the satellite, its distance from the satellite has already been calculated, and timing alignment made to allow the uplink signals from the various mobile stations to arrive at the satellite, or the BTS, at substantially the same time, or at least within the cyclic prefix.

Similarly, when the BTS sends a communication signal through the satellite to a mobile station, the timing alignment is made to allow the downlink signals from the diverse satellites to arrive at the mobile station, at substantially the same time, or at least within the cyclic prefix. Alternately, the terrestrial BTS could also provide ranging information to the mobile stations. This would assist the process of adapting ranging over a satellite link. The ranging for each BTS coverage area could be calculated and provided to the mobile stations. When a mobile station loses coverage provided by the BTS, which may occur when it powers on in a new location out of range of the BTS terrestrial coverage, it could then resume communication with a satellite in order to establish correct ranging. The timing alignment calculations include, for example, allowance for the distance between the mobile station and the satellite, for the distance between the BTS and the satellites, and any delays incurred by terrestrial network connections.

Initial ranging acquires the initial time synchronization when a new mobile station is joining system 10. For example, mobile station 12 sends out its ranging signal which is received through both satellites 16 and 18. The BTS chooses which satellite is the primary satellite, and instructs the mobile station 12 to adjust its timing so that it is synchronized to that (primary) satellite. The other (diverse) satellite will receive a signal that is either early or late, i.e. not within the cyclic prefix. As is discussed below, the BTS may instruct the mobile station to adjust its transmission timing and frequency offset to equalize the delay among the diverse paths so that the signals arrive at the BTS at substantially the same time.

Periodic ranging may be performed to ensure that each active mobile station remains in time synchronization. This requires less timing adjustment than initial ranging since the mobile station timing synchronization would not have moved too far from the previous periodic ranging. Here, the mobile station again sends out a ranging signal, and the BTS instructs it to advance or delay its timing in order to maintain synchronization.

The present invention describes a method and system that synchronizes each of the mobile station's timing to a "virtual satellite" at an intermediate point between the two physical satellites. After a primary ranging adjustment has been assigned, the mobile station will be instructed to adjust its timing in order to be synchronized to the "virtual satellite" location. These timing adjustments are under the control of the BTS. The actual ranging process for each mobile station would be different, due to their different geographical locations. When a mobile station relocates, the BTS maintains timing synchronization to a "virtual satellite" via periodic ranging. However, the imaginary location of this "virtual satellite" could be in a different location.

The "virtual satellite" calculation changes when the mobile station's location changes, necessitating a new ranging compensation. For a given pair of mobile stations, m1, m2, with given coordinates (x1, y1) and (x2, y2), and a given pair of satellites s1, s2, the coordinate of the "virtual satellite" that satisfies the timing requirement just for (x1, y1) and (x2, y2) can be determined. When m1 and m2 move to a new location, e.g., (x1', y1') and (x2', y2'), the timing alignment requirement will change, and therefore, the coordinate of the "virtual satellite" will need to change to in order to satisfy the new timing alignment. This is explained by the following equations: (1) Timing Advance=T(m1,s1)−T(m2,s1), such that primary paths are synchronized at s1; and (2) Diverse paths are misaligned @ s2=[T(m1,s1)−T(m2,s1)]−[T(m1,s2)−T(m2,s2)]

The ranging process used to determine a timing adjustment as calculated in equation (1) allows synchronization over s1, but causes misalignment over s2. An improvement proposed by the present invention is to split the misalignment between s1 and s2. The splitting is done by the BTS for each mobile station. This act of splitting can be conceptually referred to as "ranging through a virtual satellite". Again, the position of the "virtual satellite" is a variable dependent on the timing misalignment needed to be corrected/split. The position of the "virtual satellite" therefore can be thought of as variable with respect to at least two axes as the location of the mobile station changes.

However, the satellite that receives an uplink communication from a mobile station is not always the same satellite that was involved in the ranging process for that mobile station. In FIG. 1, mobile station 12 transmits ranging signals to satellite 16 via path 20 and satellite 18 via path 24. Mobile station 14 also performs its ranging with satellite 18 via path 22 and with satellite 16 via path 26. The BTS determines from which satellite the received signal will be used for ranging. Rather than using signals from different satellites for different mobiles, the BTS designates a satellite for its ranging procedure and uses that satellite's signal for all the mobiles. The BTS will use the signals received from satellite 16 to perform ranging with all mobiles, and the signal path to satellite 16 is designated as the primary path. The path to satellite 18 is designated as the diversity path.

Because this is a diverse system, mobile station 12 may transmit to satellite 18, through its "diverse path" 24. Thus, on occasions, mobile station 12 and mobile station 14 will each transmit to satellite 18. In this scenario, in order to avoid ISI, the time delay difference between mobile station 12 and its uplink transmission to satellite 18, and mobile station 14 and its uplink transmission to satellite 18, must be within a given cyclic prefix in order to avoid ISI. However, because mobile stations 12 and 14 performed their ranging with a different satellite (satellite 16), timing misalignment may occur unless an alignment scheme is implemented. The present invention provides such an alignment scheme.

Figure 2:
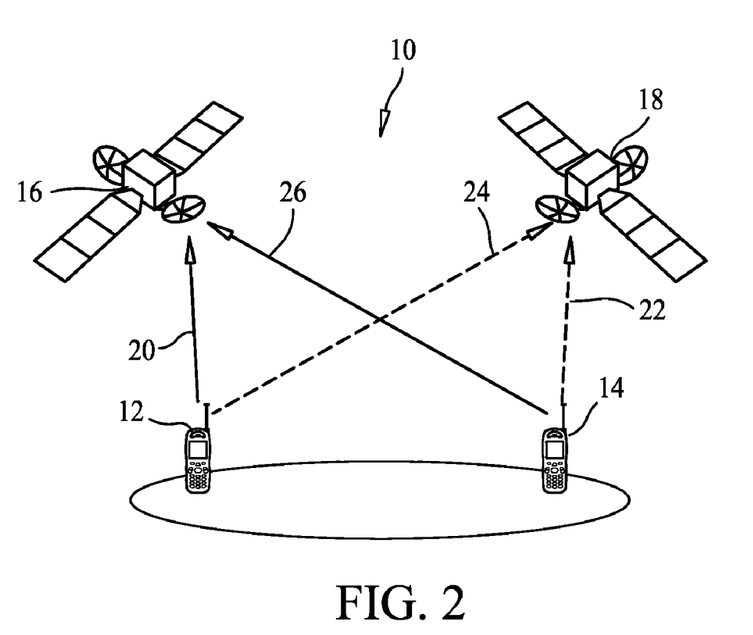
FIG. 2 is an illustration of a diverse satellite communication system whereby a first satellite is designated as a primary satellite and a second satellite selected as a diverse satellite.
Figure 3:
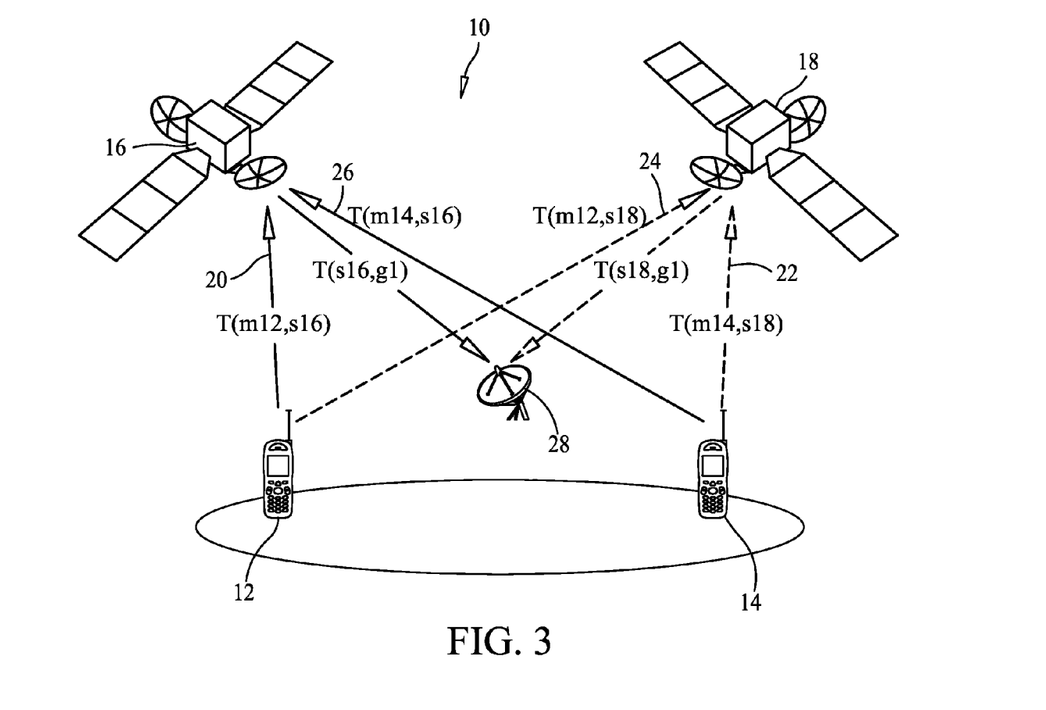
FIG. 3 is an illustration of a diversity timing misalignment issue that is addressed by the present invention.

FIGS. 2 and 3 illustrate an embodiment of the present invention that may be implemented to solve the time misalignment issue discussed above. One satellite is designated as the "main" satellite, and the other satellite designated as the "diverse" satellite. In FIG. 2, satellite 16 has been designated as the main or primary satellite. All mobile stations (in this case, mobile station 12 and mobile station 14) may use satellite 16 for their ranging (as determined by the BTS), as indicated by the solid lines 20 and 26. Thus, mobile station 14, which had previously transmitted ranging signals to both satellites 16 and 18, now uses satellite 16 as its primary (ranging) satellite and satellite 18 as its diverse satellite. Satellite 18 is designated as the diverse satellite and receives signals that have a time difference equal to the difference in path length between the two satellites.

In FIG. 3, gateway 28 represents a computer system that switches data signals and/or voice signals between one or more satellites and other terrestrial networks. The designation T(Mx, Sy) in FIG. 3 refers to the absolute time delay from mobile station x to satellite y, in microseconds. The designation T(Sx, G) refers to the absolute time delay from satellite x to the gateway 28, in microseconds. The satellite-to-gateway time delay is ignored in the timing calculations because it represents a common path for mobile station 12 and mobile station 14. In this example, mobile station 12 and mobile station 14 each use the same satellite 16 for ranging. Thus, when each mobile station uses satellite 16 as its primary satellite, the uplink transmissions from each mobile station to satellite 16 should not result in a misalignment problem (i.e., should not fall outside the cyclic prefix) since each mobile station had already synchronized their relative position with respect to satellite 16 via the ranging process. However, when uplink transmissions are sent to satellite 18, the "diversity" satellite in this scenario, the signals may arrive at different times and depending on the cyclic prefix, it is uncertain if this would result in a misalignment issue.

Figure 4:
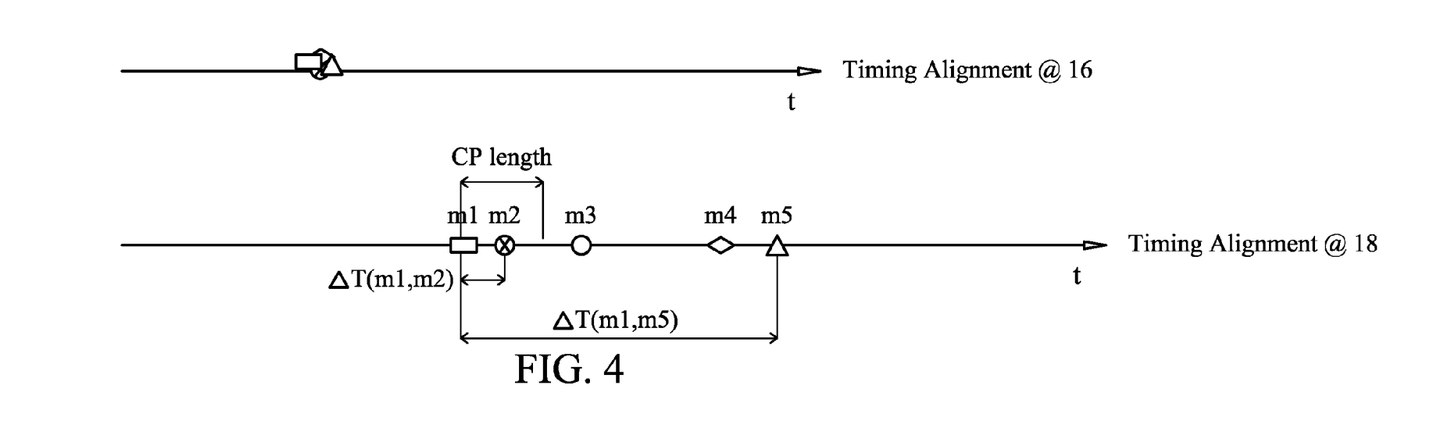
FIG. 4 illustrates the diversity timing misalignment over a second satellite path.

The present invention provides that the timing misalignment is split between the primary and diverse paths by adjusting the offset among mobile stations during the uplink portion of the ranging process. In FIG. 4, two timing alignment paths are shown, one for satellite 16 and one for satellite 18. Mobile stations 1 through 5 are all ranged to satellite 16. Thus, the uplink transmissions to satellite 16 for mobile stations 1 through 5 can be grouped together without a timing misalignment problem. However, the timing alignment scenario with respect to satellite 18 (the designated "diverse" satellite), is different.

Figure 5:
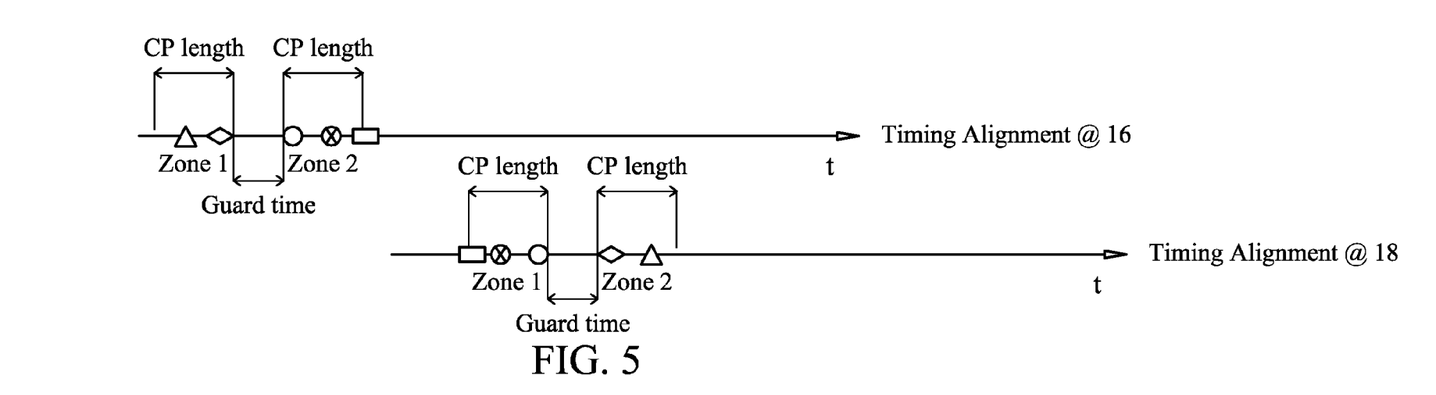
FIG. 5 illustrates the timing alignment with respect to the second satellite path after adjustment.

In the exemplary embodiment depicted in FIGS. 4 and 5, five mobile stations are to be used in a diverse satellite system that includes two satellites 16 and 18. The invention is of course not limited to a particular number of mobile stations or satellites. The five mobile stations are designated as m1, m2 . . . m5, and each are given a unique identifying shape in FIGS. 4 and 5. In FIG. 4, the designation $\Delta T(m_i, m_j)$ represents the timing misalignment and equals the timing differential between mobile station i and mobile station j over the path to the primary satellite 16, $[T(m_i,s_{16})-T(m_j,s_{16})]$, and the timing differential to the path to the diverse satellite 18, $[T(m_i,s_{18})-T(m_j,s_{18})]$. Thus, in FIG. 4, with respect to satellite 18, $\Delta T(m_1, m_2)$ represents the timing misalignment between mobile station 1 and mobile station 2 when communicating with satellite 18 after the ranging process via satellite 16. Similarly, the designation $\Delta T(m_1, m_5)$ represents the timing misalignment between mobile station 1 and mobile station 5 when communicating with satellite 18 after the ranging process via satellite 16. As shown, the relative timing differentials between mobile station 1 and mobile station 3, mobile station 1 and mobile station 4, and mobile station 1 and mobile station 5, are outside of a given cyclic prefix length. Thus, further adjustment is required.

The present invention addresses the misalignment problem discussed above by evenly distributing the timing misalignment between the primary satellite 16 along path 20 and the diverse satellite 18, along path 22. When the system includes more than two satellites, the distribution can be calculated by a variety of weighting schemes. For example, the weighted average of the distance between two adjacent satellites can be used in determining an optimal misalignment distribution scheme.

The procedure used to calculate this adjustment includes a first step whereby the mobile stations are sorted based on their delay values over satellite 18, from lowest to highest. In this example, it is assumed that mobile station 1 has the lowest delay. The second step involves adjusting each mobile station's timing offset by the following: $\frac{1}{2}[\Delta T(m_i, m_j, s16)-\Delta T(m_i, m_j, s18)]$, where i=2 . . . N. Again, it is assumed that $m_1$ has the minimum delay over path 22 to satellite 18. Thus, the adjustment serves to decrease, by half, the various timing misalignments, and "shift" or re-allocate the various mobile station timing misalignments between satellite 16 and satellite 18.

FIG. 5 illustrates the timing alignments over each satellite path after the timing adjustment of the present invention has been performed. It can be seen that the timing adjustment performed by the present invention has reduced the timing misalignment over the diverse satellite 18 by half and relocated the same amount to the primary satellite 16.

In addition to splitting the timing misalignment between the two satellites, mobile stations can be arranged into groups to further improve timing alignment. In some cases the size of the satellite coverage region on the ground may exceed the timing compensation capability of the cyclic prefix. This may happen, for example, if the size of the spot beam cell is such that the time difference for the signals from the two satellites to reach the opposite edges of the cell exceed the cyclic prefix. To address this case, the mobile stations may be grouped into "zones". Each zone includes the mobile stations that, relative to each other, have maximum timing differentials within the cyclic prefix window, due to the timing offset adjustment described above. The grouping or zoning of the mobile stations can be done in one of two ways, static zoning or dynamic zoning. A static zoning scheme is illustrated in FIG. 6.

Figure 6:
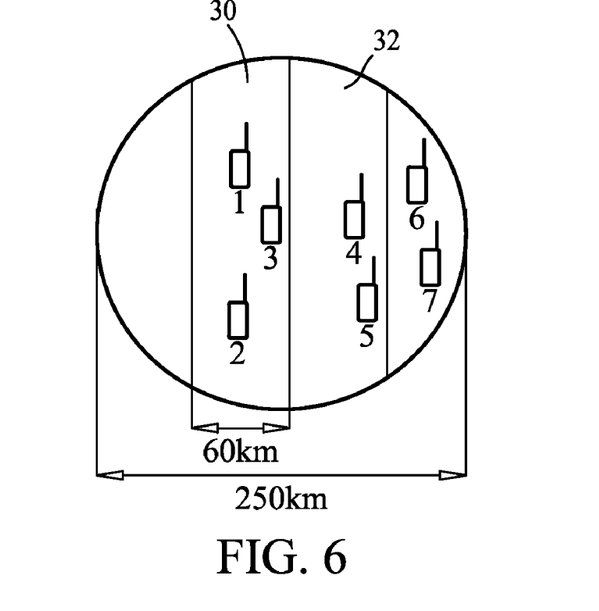
FIG. 6 illustrates the static grouping of mobile stations in accordance with the principles of the present invention
Figure 7:
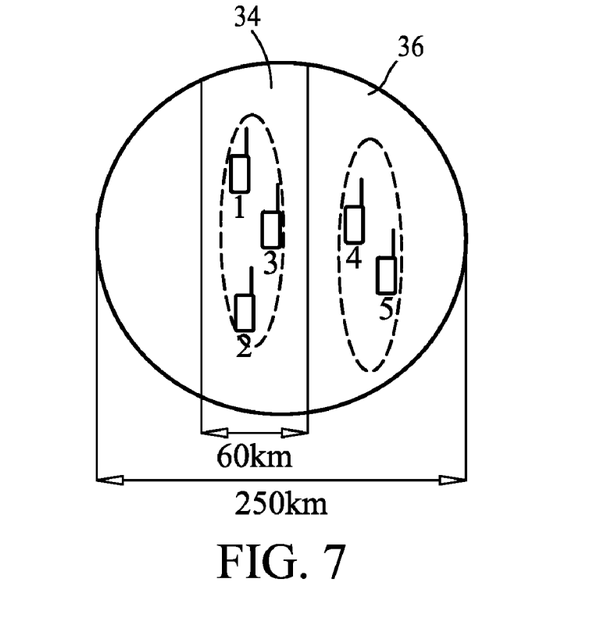
FIG. 7 illustrates the dynamic grouping of mobile stations in accordance with the principles of the present invention.

In the static zoning scheme shown in FIG. 6, the spot beam of a satellite is divided into multiple zones along a particular direction, for example, a north-south direction, according to the geo-location delay characteristics with respect to the two satellites 16 and 18. The spot beam range of 250 km and the zone range of 60 km shown in FIGS. 6 and 7 are exemplary only. Mobile stations inside a particular zone (for example, mobile stations 1 and 2 within zone 30, and mobile stations 4 and 5 within zone 32) can satisfy the timing requirements for satellite diversity and thus can be scheduled together by sharing subchannels. Mobile stations that are in different zones (for example, mobile station 3 in zone 30 and mobile station 4 in zone 32) cannot meet the diversity requirements and must transmit on different subchannels or must insert additional guard time between their transmissions during scheduling.

Another method of grouping the mobile stations is a dynamic grouping method, as illustrated in FIG. 7. The dynamic grouping method groups the mobile stations based upon their relative misalignment values. After the timing adjustment described above is performed, the mobile stations are again sorted based on their delay values, starting with the mobile station with the lowest delay, i.e. mobile station 1. The groups or zones are then formed according to the following: Max [$\Delta T(m_i,m_j, s16) - \Delta T(m_i,m_j, s18)$] < cyclic prefix length, where i<j, j=i+1 ... $N_g$. The next step resets i to $N_{g+1}$. The steps are repeated until all mobile stations have been grouped. In this zoning scheme, mobile stations inside each zone (e.g., stations 1, 2 and 3 in zone 34, and stations 4 and 5 in zone 36) can meet the timing requirement for satellite diversity and therefore their transmissions may be scheduled together.

Figure 8:
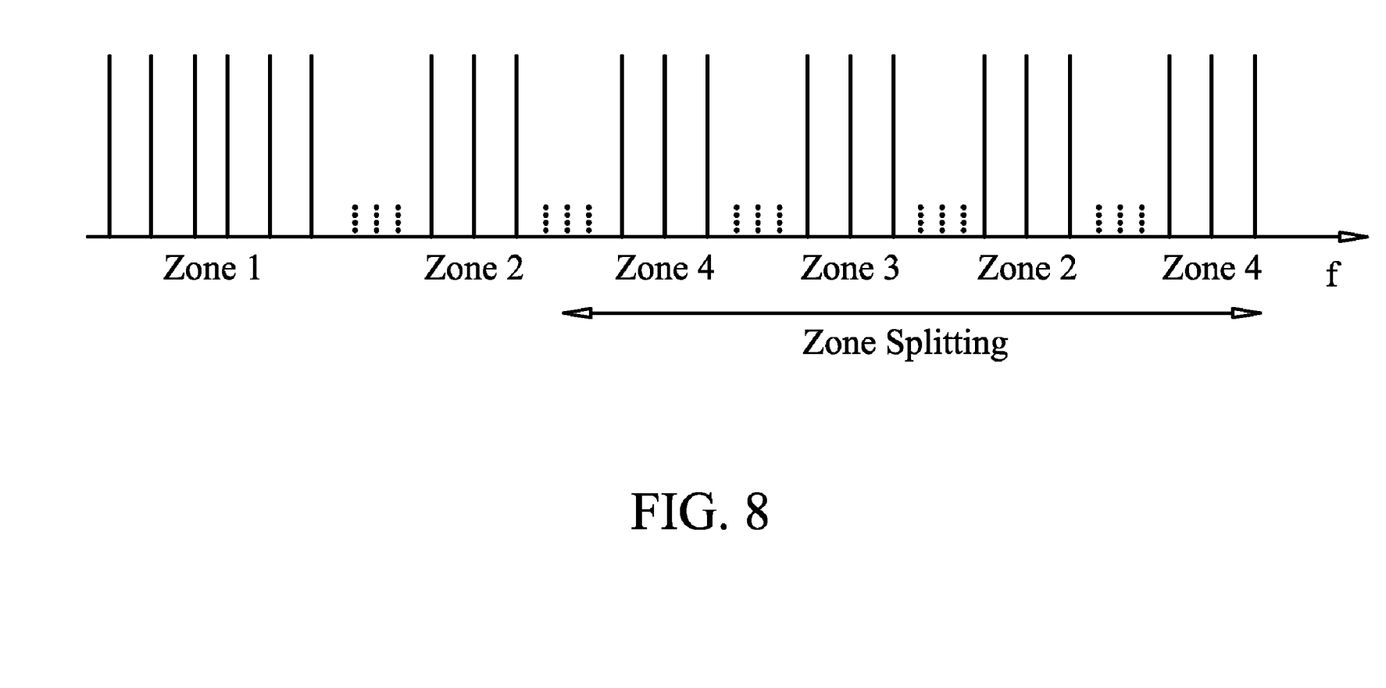
FIG. 8 illustrates an uplink transmission mechanism used in accordance with the principles of the present invention.

After the timing offset among the mobile stations has been adjusted and the mobile stations grouped into zones according to one of the grouping schemes described above, the mobile station uplink transmissions can be scheduled. As shown in FIG. 8, each of the mobile stations can be divided among n zones, in a frequency domain, where each zone has a plurality of sub-channels. Guard carriers can be inserted between the zones to reduce interference. The size of each zone can vary depending upon the number of mobile stations and communication traffic. Provided there is the requisite bandwidth, frequency hopping within a zone can be supported. A zone can be split (e.g. zone 2, and zone 4) to obtain the benefit of frequency hopping across the entire bandwidth. This scheme will likely require additional guard carriers between frequency bands for each zone. A further modification of the zoning implementation as applied to a frequency domain, as shown in FIG. 8, is to separate the groups of sub-carriers used in each zone with guard sub-carriers such that signals from different zones do not cause ISI with other signals with different timing alignments.

Figure 9:
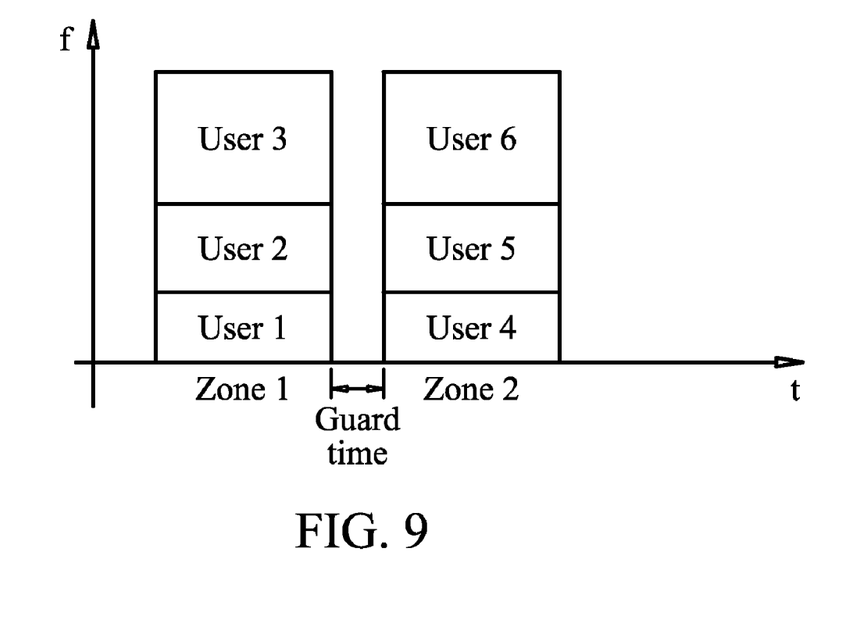
FIG. 9 illustrates an alternate uplink transmission mechanism used in accordance with the principles of the present invention.

FIG. 9 depicts another uplink transmission scheduling scheme. In FIG. 9, rather than delivering the uplink transmission of mobile stations according to frequency, a TDMA-type multiplexing scheme is used. Here, a different time block is allocated for one or more zones of mobile stations. Mobile stations in one zone will have their uplink transmissions scheduled at a particular time block, while mobile stations in another zone will have their uplink transmissions scheduled at a different time block. Sufficient guard time can be provided between frames in order to avoid interference.

Figure 10:
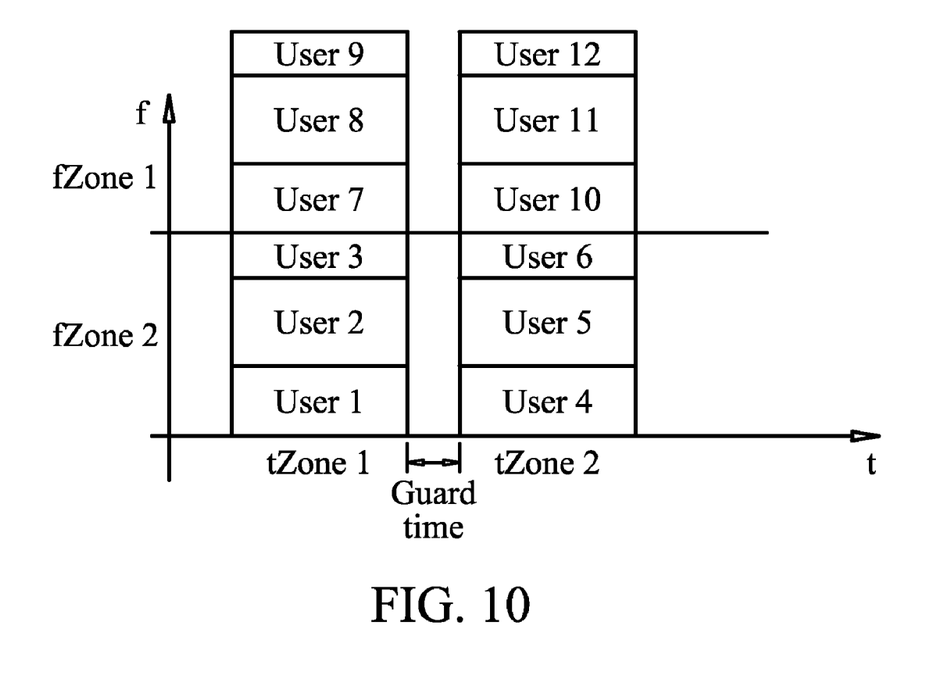
FIG. 10 illustrates yet another uplink transmission mechanism used in accordance with the principles of the present invention.

In FIG. 10, a hybrid of the frequency and the TDMA-type scheduling methods is used. This two-dimensional scheduling approach allows for "n" frequency zones and "m" time zones to improve performance. Zones are created according to frequency and according to time, with a time guard inserted between TDMA zones and guard sub-carriers between frequency zones. Here, mobile stations within a common sub-channel block and a common time division block can be scheduled to transmit signals together.

Still another solution to the timing misalignment problem that occurs in diversity satellite systems is to alter the cyclic prefix window. While major adjustments to the cyclic prefix length usually result in a substantial overhead increase, a larger cyclic prefix window will tolerate a greater timing misalignment, therefore resulting in a reduction in the number of groups or zones. Adaptively changing the cyclic prefix based on the mobile stations' timing offsets within zones of a given satellite spot beam also results in an overall benefit in diversity gain. In this configuration, signals from some zones would use a different cyclic prefix than others. This flexibility, however does introduce some framing overhead due to the increase in cyclic prefix length. The adjustment of the cyclic prefix window may be used in conjunction with none, some, or all of the above-described timing misalignment solutions.

The techniques of the present invention may also be applied to the direction of transmission from the terrestrial BTS via diverse satellites to mobile or other fixed remote station receivers. In this case, it is advantageous if the signals of the diverse satellite paths all arrive at the receiver at substantially the same time or within the cyclic prefix. When such a condition is met, the receiver may easily process the signals and may use a single antenna. To ensure this condition, the signals for each spot beam through each of the diverse satellite links may be adjusted in timing to assure their arrival at a point in the coverage zone at substantially the same time or within the cyclic prefix. This may, for example, require that the signals through one satellite be transmitted before signals through other satellites and with different timing for the different spot beams if the satellite system incorporates such spot beams.

Similar compensation calculations including the distances to the satellites and the coverage areas as described herein for the uplink compensation may be used to derive the required timing adjustments. In the event that the size of the coverage area exceeds the allowance within the cyclic prefix, the receivers may be grouped into zones, with the needed timing compensation for each zone, and the transmissions to different zones arranged in different time intervals such as in TDMA. Alternatively, the cyclic prefix may be extended for signals transmitted to the larger cell areas. Some of the signals sent to the mobile or fixed remote receivers from the BTS are designed to be received by all the receivers. These include, for example, burst preamble, synchronization, bust profile and time slot assignment information. To assure that these transmissions are properly received by all the receivers in the spot beam cell, they may be sent with a longer cyclic prefix, a lower modulation and coding rate and with increased error correction coding designed to compensate for the possibility of ISI.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of transmitting OFDM signals between a plurality of spatially separated transmit antennas and at least one receive antenna, the method comprising:
   determining relative timing differential values for the plurality of transmit antennas when the transmit antennas transmit OFDM signals to the at least one receive antenna via at least one diverse path, wherein the relative timing differential values result in a timing misalignment; and
   resolving the timing misalignment by allocating the relative timing differential values among the one or more diverse paths; and
   grouping the spatially separated transmit antennas into zones based at least in part on timing characteristics.

2. The method of claim 1, wherein the at least one receive antenna is mounted to a satellite.

3. The method of claim 1, wherein the timing characteristics include relative timing differential values such that a maximum timing differential value within a zone is not more than a predetermined limit.

4. The method of claim 3, wherein the limit is based on a length of a cyclic prefix of the OFDM signals.

5. The method of claim 4, further comprising increasing the length of the cyclic prefix to decrease a likelihood of timing misalignment.

6. The method of claim 3, further comprising inserting guard carriers between transmit antenna transmissions for each zone.

7. The method of claim 3, further comprising scheduling transmission of signals to respective receive antennas associated with the transmit antennas, wherein signals for receive antennas associated with transmit antennas in at least one zone are scheduled together.

8. The method of claim 3, further comprising sizing each zone into one or more subchannel blocks, wherein transmit antennas within each subchannel block are scheduled to transmit signals together.

9. The method of claim 1, wherein the zones are geographic zones, the timing characteristics associated with the transmit antennas within each geographic zone satisfy timing requirements.

10. The method of claim 9, wherein transmit antennas within each geographic zone schedule their transmissions together.

11. An OFDM transceiver comprising:
   a timing differential component configured to determine relative timing differential values for a plurality of spatially separated transmit antennas when the transmit antennas transmit OFDM signals to the OFDM transceiver via at least one diverse path; and
   a timing misalignment resolution component configured to:
      allocate the relative timing differential values among the at least one diverse path; and
      group the spatially separated transmit antennas into zones based at least in part on timing characteristics.

12. The transceiver of claim 11, wherein the transceiver is mounted to a satellite.

13. The transceiver of claim 11, wherein the timing characteristics include relative timing differential values such that a maximum timing differential value within a zone is not more than a predetermined limit.

14. The transceiver of claim 13, wherein the limit is based on a length of a cyclic prefix of the OFDM signals.

15. The transceiver of claim 14, wherein the timing misalignment resolution component operates to increase the length of the cyclic prefix to decrease a likelihood of timing misalignment.

16. The transceiver of claim 13, wherein the timing misalignment resolution component operates to insert guard carriers between transmit antenna transmissions for each zone.

17. The transceiver of claim 13, the timing misalignment resolution component is further configured to schedule transmission of signals to respective receive antennas associated with the transmit antennas, such that signals for receive antennas associated with transmit antennas in at least one zone are scheduled together.

18. The transceiver of claim 13, wherein the timing misalignment resolution component is further configured to size each zone into one or more subchannel blocks, wherein transmit antennas within each subchannel block are scheduled to transmit signals together.

19. The transceiver of claim 11, wherein the zones are geographic zones, the timing characteristics associated with the transmit antennas within each geographic zone satisfy timing requirements.

20. The transceiver of claim 19, wherein the timing misalignment resolution component is further configured to schedule transmissions for transmit antennas within each geographic zone schedule together.

* * * * *